US008933893B2

(12) United States Patent
Takahashi et al.

(10) Patent No.: US 8,933,893 B2
(45) Date of Patent: Jan. 13, 2015

(54) TOUCHSCREEN DISPLAY SUBSTRATE WITH A SENSING PART FORMED IN AN AREA CORRESPONDING TO A PLURALITY OF PIXEL AREAS AND TOUCHSCREEN DISPLAY APPARATUS HAVING THE SAME

(75) Inventors: Seiki Takahashi, Cheonan-si (KR); Jae-Hoon Lee, Seoul (KR); Sang-Soo Kim, Seoul (KR); Bong-Hyun You, Yongin-si (KR); Byoung-Jun Lee, Cheonan-si (KR); Sung-Jae Moon, Seoul (KR); So-Young Kim, Jeju-si (KR)

(73) Assignee: Samsung Display Co., Ltd. (KR)

( * ) Notice: Subject to any disclaimer, the term of this patent is extended or adjusted under 35 U.S.C. 154(b) by 1201 days.

(21) Appl. No.: 12/573,315

(22) Filed: Oct. 5, 2009

(65) Prior Publication Data
US 2010/0110028 A1 May 6, 2010

(30) Foreign Application Priority Data

Oct. 30, 2008 (KR) ........................ 10-2008-0107084

(51) Int. Cl.
G06F 3/041 (2006.01)
G06F 3/044 (2006.01)
(52) U.S. Cl.
CPC .............. *G06F 3/0412* (2013.01); *G06F 3/044* (2013.01)
USPC ........................................................ 345/173

(58) Field of Classification Search
USPC ......................................................... 345/173
See application file for complete search history.

(56) References Cited

U.S. PATENT DOCUMENTS

| 4,338,597 | A | * | 7/1982 | Steiner et al. ................. 345/213 |
| 2008/0006828 | A1 | * | 1/2008 | Zhang et al. .................... 257/72 |
| 2009/0101900 | A1 | * | 4/2009 | Chuang et al. .................. 257/59 |
| 2009/0115735 | A1 | * | 5/2009 | Chuang ......................... 345/173 |
| 2009/0135158 | A1 | * | 5/2009 | Takahashi et al. ............. 345/174 |

FOREIGN PATENT DOCUMENTS

| JP | 2001-042296 A | 2/2001 |
| JP | 2007122056 A | 5/2007 |
| JP | 2008097171 A | 4/2008 |
| JP | 2008122659 A | 5/2008 |
| KR | 1020060009602 A | 2/2006 |
| KR | 1020070044948 A | 5/2007 |
| KR | 1020070044952 A | 5/2007 |

* cited by examiner

*Primary Examiner* — William Boddie
*Assistant Examiner* — Andrew Schnirel
(74) *Attorney, Agent, or Firm* — Cantor Colburn LLP

(57) ABSTRACT

A touchscreen display substrate includes; a plurality of pixel parts including a plurality of first pixel rows arranged in a first direction, and a plurality of pixel columns arranged in a second direction substantially perpendicular to the first direction, wherein each of the plurality of pixel parts includes a pixel electrode, and a plurality of sensing parts which sense a touch state, the sensing parts being disposed in an area corresponding to the plurality of pixel parts, and being sequentially arranged in the first direction between adjacent pixel parts of first plurality of pixel columns.

13 Claims, 10 Drawing Sheets

TOUCHSCREEN DISPLAY SUBSTRATE WITH A SENSING PART FORMED IN AN AREA CORRESPONDING TO A PLURALITY OF PIXEL AREAS AND TOUCHSCREEN DISPLAY APPARATUS HAVING THE SAME

This application claims priority to Korean Patent Application No. 2008-107084, filed on Oct. 30, 2008, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a touchscreen display substrate and a touchscreen display device having the touchscreen display substrate. More particularly, exemplary embodiments of the present invention relate to a touchscreen display substrate applicable to a liquid crystal display ("LCD") device, and a touchscreen display device having the touchscreen display substrate.

2. Description of the Related Art

Generally, liquid crystal display ("LCD") devices have various characteristics such as being relatively thin, having light weight, and low power consumption, and are thus they have become widely used in monitors, notebooks, cell phones, etc. An LCD device includes an LCD panel displaying an image using the light transmissivity properties of liquid crystal and a backlight assembly disposed below the LCD panel to provide the LCD panel with light.

The LCD panel typically includes an array substrate, an opposite substrate and a liquid crystal layer. The array substrate typically includes a signal line, a thin-film transistor ("TFT") and a pixel electrode. The opposite substrate typically includes a common electrode. The opposite substrate faces the array substrate. The liquid crystal layer is interposed between the array substrate and the opposite substrate.

A touchscreen display panel may be made by integrating a touch electrode and a sensing line on the LCD panel in order to detect a position signal through externally applied pressure. When pressure is applied onto the touchscreen panel by an object such as finger, a pen, etc., a position signal corresponding to the position onto which the pressure is applied through the touch electrode is generated, and the position signal is read-out through the sensing line. The position signal may be formed when the capacitance of a capacitor between the common and the touch electrodes is changed due to the externally applied pressure. Alternatively, the position signal may be formed by contacting the common electrode with the touch electrode.

BRIEF SUMMARY OF THE INVENTION

Exemplary embodiments of the present invention provide a touchscreen display substrate capable of improving sensing characteristics.

Exemplary embodiments of the present invention also provide a touchscreen display device having the above-mentioned touchscreen display substrate.

According to one exemplary embodiment of the present invention, a touchscreen display substrate includes; a plurality of pixel parts including a plurality of pixel rows arranged in a first direction, and a plurality of pixel columns arranged in a second direction substantially perpendicular to the first direction, and wherein each of the plurality of pixel parts includes a pixel electrode, and a plurality of sensing parts which sense a touch state, the plurality of sensing parts being disposed in an area corresponding to the plurality of pixel parts, and being sequentially arranged in the first direction between adjacent pixel parts of the plurality of pixel columns.

In one exemplary embodiment, the touchscreen display substrate further includes; a gate line disposed substantially in parallel with pixel parts of the plurality of pixel rows, a data line disposed substantially in parallel with pixel parts of the plurality of pixel columns, a voltage line which applies a power voltage to the sensing parts, a reset line which applies a reset voltage to the sensing parts, and a sensing line which outputs a sensing signal from at least one of the plurality of sensing parts to an exterior. In one exemplary embodiment, the plurality of sensing parts include; a first sensing part having a reference capacitor connected to the $(3k-2)$-th gate line, wherein 'k' is a natural number, a touch electrode connected to the reference capacitor, a switching element connected to the touch electrode and a reset element connected to the $(3k-1)$-th gate line and a second sensing part having a reference capacitor connected to the $(3k-1)$-th gate line, a touch electrode connected to the reference capacitor, a switching element connected to the touch electrode and a reset element connected to the $(3k)$-th gate line.

According to another exemplary embodiment of the present invention, a touchscreen display substrate includes; a plurality of pixel parts including; a plurality of pixel rows disposed in a first direction, a plurality of second pixel rows disposed in a second direction substantially perpendicular to the first direction, wherein each of the plurality of pixel parts includes a liquid crystal capacitor which displays grayscale images, and a plurality of sensing parts, the plurality of sensing parts being disposed in an area corresponding to the plurality of pixel parts, and being sequentially arranged in the first direction between adjacent pixel parts of the plurality of pixel columns, each of the plurality of sensing parts including a sensing capacitor which senses a touch status.

According to the present invention, as a sensing part is formed in an area corresponding to a plurality of pixel areas to form a large-sized switching element, the sizes of a reference capacitor and a sensing capacitor may be increased. Thus, sensing characteristics of the sensing part may be improved.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
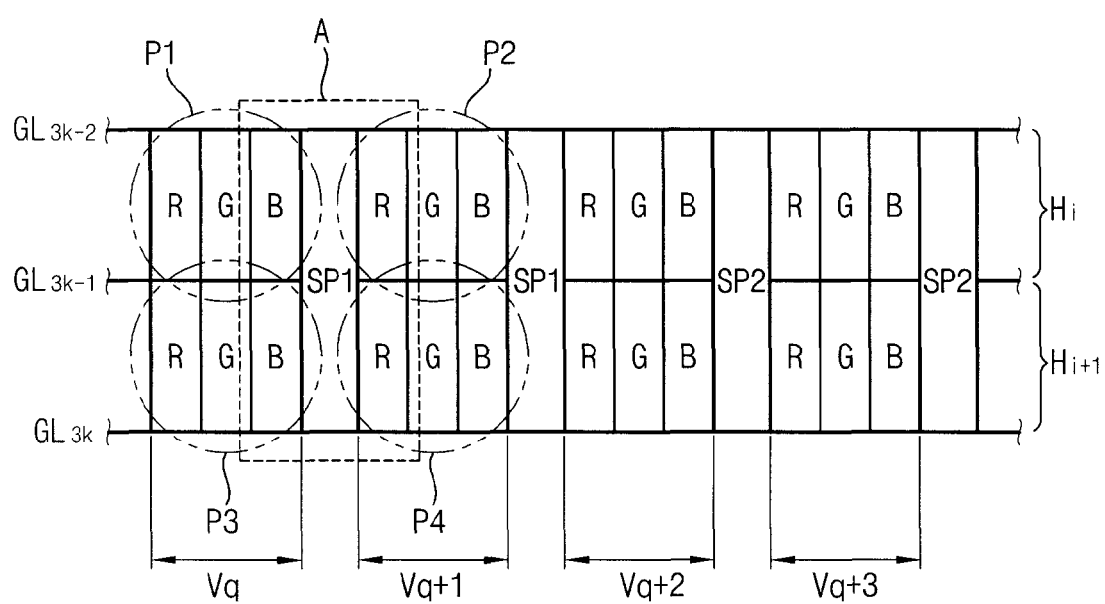
FIG. 1 is a diagram illustrating an exemplary embodiment of a touchscreen display device according to Exemplary Embodiment 1 of the present invention.
Figure 1:
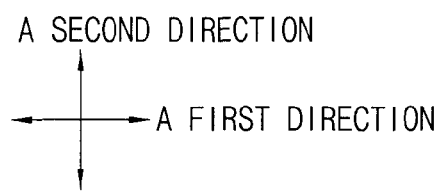

The invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like reference numerals refer to like elements throughout.

It will be understood that when an element is referred to as being "on," another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
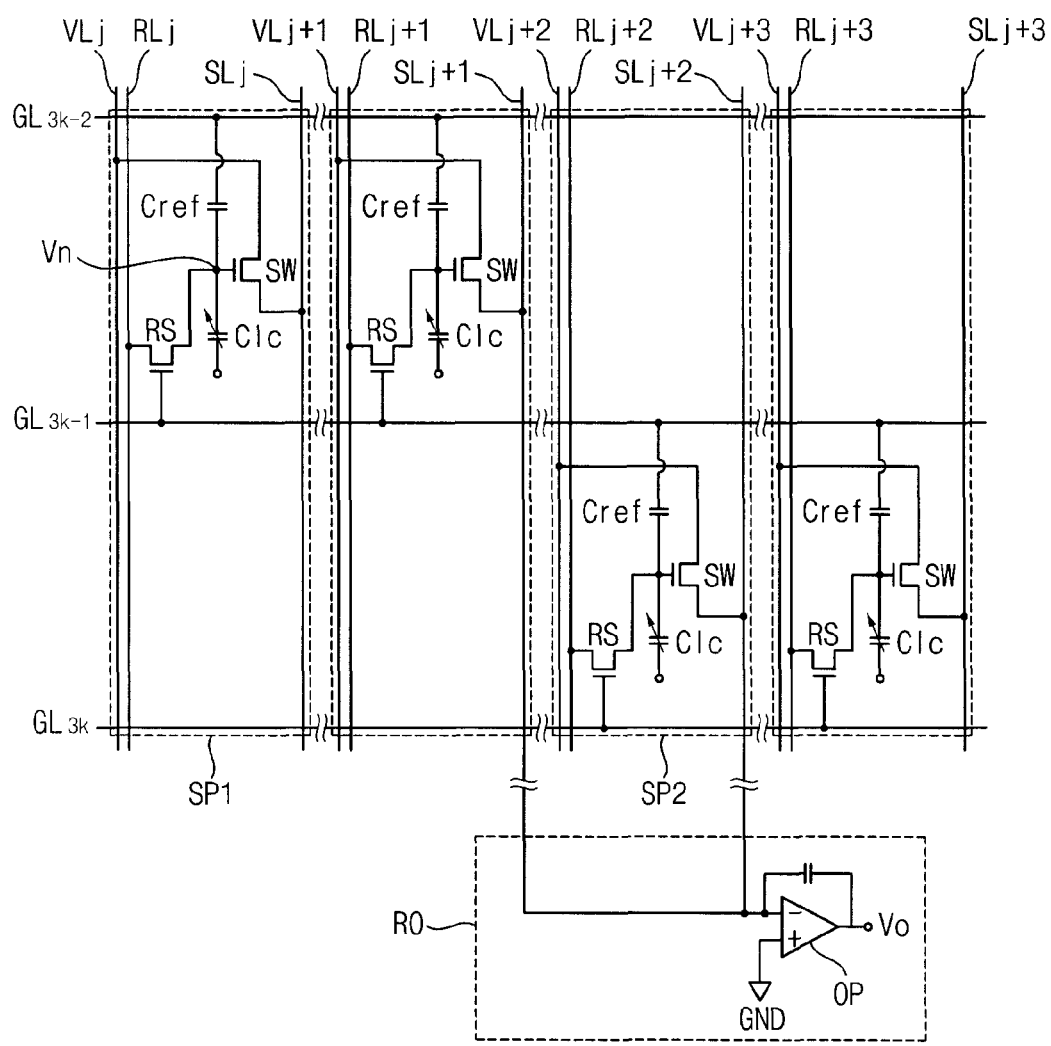
FIG. 2 is a schematic circuit diagram illustrating an exemplary embodiment of a sensing part of the exemplary embodiment of a touchscreen display device in FIG. 1.

FIG. 1 is a diagram illustrating an exemplary embodiment of a touchscreen display device according to Exemplary Embodiment 1 of the present invention. FIG. 2 is a schematic circuit diagram illustrating an exemplary embodiment of a sensing part of the exemplary embodiment of a touchscreen display device in FIG. 1.

Referring to FIGS. 1 and 2, the exemplary embodiment of a touchscreen display device includes a plurality of pixel parts P displaying an image, a plurality of sensing parts SP sensing a touch status and a readout part RO.

In one exemplary embodiment, the pixel parts may be disposed in a matrix shape. Each of the pixel parts P may include a plurality of color pixels. In one exemplary embodiment, the pixel parts may include a red pixel "R", a green pixel "G" and a blue pixel "B" disposed adjacent to each other in a first direction. In one exemplary embodiment, the first direction may be a horizontal direction.

The pixel parts may include a plurality of pixel rows $H_i$ and $H_{i+1}$ and a plurality of pixel columns $V_q, \ldots, V_{q+3}$. In one exemplary embodiment, the pixel columns $V_q, \ldots, V_{q+3}$ may extend along a second direction substantially perpendicular to the first direction. Hereinafter, the pixel rows are referred to as horizontal rows, and the pixel columns are referred to as vertical columns.

In one exemplary embodiment, an (i)-th horizontal row Hi may include pixel parts connected to the (3k−1)-th gate line $GL_{3k-1}$, and the (i+1)-th horizontal row may include pixel parts connected to the (3k)-th gate line $GL_{3k}$. Here, 'i' and 'q' are natural numbers.

The sensing parts may be disposed in an area corresponding to a plurality of pixel parts sequentially disposed between adjacent horizontal rows in the second direction. As described above, the second direction may be a vertical direction. The sensing parts may include two types of sensing parts, that is, a first sensing part SP1 and a second sensing part SP2. As shown in FIG. 1, the first sensing part SP1 is disposed in an area corresponding to the first and the third pixel parts P1 and P3 and disposed between the first and second parts P1 and P2.

As shown in FIG. 1, a pair of the first sensing parts SP1 and a pair of the second sensing parts SP2 are disposed one after the other in the first direction. The first sensing part SP1, the first sensing part SP1, the second sensing part SP2 and the second sensing part SP2 are disposed in order according to two horizontal rows Hi and Hi+1 and between adjacent vertical rows Vq, . . . , Vq+3, respectively.

The first sensing part SP1 is driven by a gate signal of a high level applied to the (3k−2)-th gate line $GL_{3k-2}$, and the first sensing part SP1 is reset by the gate signal of a high level applied to the (3k−1)-th gate line $GL_{3k-1}$. The second sensing part SP2 is driven by the gate signal of a high level applied to the (3k−1)-th gate line $GL_{3k-1}$, and the second sensing part SP2 is reset by the gate signal of a high level applied to the (3k)-the gate line $GL_{3k}$. As discussed herein, 'k' is a natural number.

Referring to FIG. 2, the first sensing part SP1 may include a reference capacitor Cref, a sensing capacitor Clc, a switching element SW and a reset element RS.

The reference capacitor Cref may include a first electrode connected to the (3k−2)-th gate line $GL_{3k-2}$ and a second electrode connected to the sensing capacitor Clc. The sensing capacitor Clc may include a touch electrode connected to the second electrode of the reference capacitor Cref and a common electrode applied with a common voltage Vcom. The switching element SW may include an input electrode (e.g., a source electrode) connected to the (j)-th voltage line VLj applied with a power signal Vdd, a control electrode (e.g., a gate electrode) connected to the reference capacitor Cref and the sensing capacitor Clc and an output electrode (e.g., a drain electrode) outputting a sensing signal. The output electrode of the switching element SW is connected to the (j)-th sensing line SLj. The reset element RS may include a control electrode connected to the (3k−1)-th gate line $GL_{3k-1}$, an input electrode connected to the (j)-th reset line RLj to which a reset signal Vreset is applied, and an output electrode connected to the control electrode of the switching element SW. As discussed herein, 'j' is a natural number.

In one exemplary embodiment, the second sensing part SP2 may include a reference capacitor Cref, a sensing capacitor Clc, a switching element SW and a reset element RS2, similar to the first sensing part SP1.

The reference capacitor Cref may include a first electrode connected to the (3k−1)-th gate line GL3k−1 and a second electrode connected to the sensing capacitor Clc. The sensing capacitor Clc may include a touch electrode connected to the second electrode of the reference capacitor Cref and a common electrode applied with the common voltage Vcom. The switching element SW may include an input electrode connected to the (j+2)-th voltage line VLj+2 applied with the power signal Vdd, a control electrode connected to the reference capacitor Cref and the sensing capacitor Clc, and an output electrode outputting a sensing signal. The output electrode of the switching element SW is connected to the (j+2)-th sensing line SLj+2. The reset element RS may include a control electrode connected to the 3k gate line GL3k, an input electrode connected to (j+2)-th reset line RLj+2 to which the reset signal Vreset is applied, and an output electrode connected to the control electrode of the switching element SW.

A width-to-length (W/L) ratio, that is, the ratio of a channel width W to a channel length L of the switching element SW, is set to have a predetermined size. In one exemplary embodiment, the W/L ratio of the switching element SW is about 100:4.5 to about 400:4.5. For example, when a channel width W of the switching element SW is about 275 μm and a channel length L of the switching element SW is about 4.5 μm, a parasitic capacitance Cgd+Cgs of the switching element is about 0.22 pF. The larger the size of the switching element SW, the larger the capacity of the reference capacitor Cref and the sensing capacitor Clc is set to be. In one exemplary embodiment, if the reference capacitance is equal to or greater than about 1 pF, the capacitance of the sensing capacitor Clc is equal to or greater than about 0.15 pF.

In one exemplary embodiment, a driving process of the first and the second sensing parts SP1 and SP2 is substantially identical. Hereinafter, a driving process of the first sensing part SP1 will be described.

When a gate signal of a high level Vg+ is applied to the (3k−2)-th gate line GL3k−1, a node voltage Vn is formed at a connection node between the reference capacitor Cref and the sensing capacitor Clc. When a touch event is generated in the sensing capacitor Vlc, e.g. by a physical pressure applied to the touchscreen display panel from an outside, the value of the sensing capacitor Clc is changed. Accordingly, the node voltage Vn is changed. The switching element SW is turned on in response to the changed node voltage Vn, and a sensing signal corresponding to the changed node voltage Vn is output to the (j)-th sensing line SLj. When a gate signal of a high level Vg+ is applied to the (3k−1)-th gate line GL3k−1, the reset element RS is turned on to output the reset signal Vreset transmitted from the (j)-th reset line RLj to the switching element SW. Accordingly, the switching element SW is reset. In one exemplary embodiment, the reset signal Vreset is a signal substantially identical to a gate signal of a low level Vg−.

The better the characteristics of the switching element SW are, the more the sensing signals having a high sensitivity may be output. The characteristics of the switching element SW are proportional to drain electric current comparative with gate voltage. A level of the drain electric current is proportional to a W/L ratio. Accordingly, the larger the size of the switching element SW is, that is, the larger the W/L ratio is, the more the sensing signals having a high sensitivity may be output.

In addition, the larger the changing range of the node voltage Vn is, the more the sensing signals having a high sensitivity may be output. The node voltage Vn may be defined as per Equation 1.

$$Vn = Vreset + ((Vg+) - (Vg-)) \times \frac{Cref}{(Cref + Clc + Cgd + Cgs)} \qquad <\text{Equation 1}>$$

As shown in Equation 1, Vg+ is a high voltage of a gate signal, Vg− is a low voltage of a gate signal, Cgd is a parasitic capacitance between a gate and a drain of a switching element SW, and Cgs is a parasitic capacitance between a gate and a source of a switching element SW.

Referring to Equation 1, the node voltage Vn is inversely proportional to the parasitic capacitance of the switching element SW, and the node voltage Vn is proportional to the reference capacitor Cref. Thus, as the area of the sensing part is extended, the sensing capacitor Clc and the reference capacitor Cref in the sensing part are formed to be larger to increase the level range of the node voltage Vn. When the level range of the node voltage Vn is increased, the level range of a sensing signal is increased so that the sensing signal is generated in response to the node voltage Vn. Accordingly, sensing characteristics of the sensing part may be improved.

Thus, sensing signals with a greater sensitivity may be output from the sensing part by improving sensing characteristics of the switching element SW, e.g., by manufacturing the switching element SW to have a large W/L ratio and by increasing a capacitance of the reference capacitor Cref and the sensing capacitor Clc.

In one exemplary embodiment, the readout part may include a plurality of amplifiers. In one exemplary embodiment the amplifiers may be operational amplifiers. A sensing signal provided from the sensing lines is input to each of the amplifiers OP. The amplifiers OP are connected to the sensing lines outputting a sensing signal of sensing parts SP1 and SP2 having reset elements RS connected to different gate lines.

In one exemplary embodiment, the amplifiers OP output a readout signal Vo in response to a sensing signal transmitted through sensing line SLj+1 when a high level signal is applied to the (3k−2)-th gate line during a horizontal period 1H, and the amplifiers OP output a readout signal Vo in response to a sensing signal transmitted through (j+2)-th sensing line SLj+2 when a high level signal is applied to the (3k−1)-th gate line, that is, during a horizontal period. Accordingly, the amplifier OP outputs the readout signal Vo by a horizontal period 1H.

Figure 3:
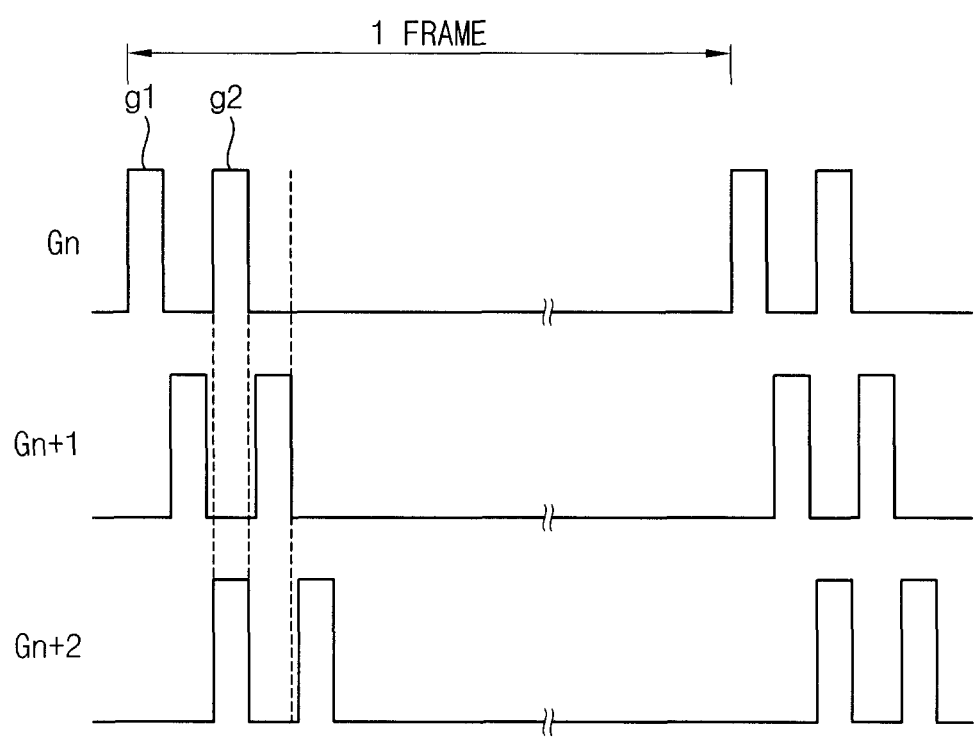
FIG. 3 is a waveform diagram of a plurality of gate signals applied to the exemplary embodiment of a touchscreen display device of FIG. 2 in accordance with one exemplary embodiment of the present invention.

FIG. 3 is a waveform diagram of a gate signal applied to the exemplary embodiment of a touchscreen display device of FIG. 2 in accordance with one exemplary embodiment of the present invention.

Referring to FIGS. 2 and 3, each of the gate signals Gn, Gn+1 and Gn+2 provided to the touchscreen display device may include a first gate pulse g1 and a second gate pulse g2 within a single frame. As discussed herein, 'n' is a natural number.

In one exemplary embodiment, the first gate signal Gn is applied to the (3k−2)-th gate line GL3k−3, the second gate signal Gn+1 is applied to the (3k−1)-th gate line GL3k−1, and the third gate signal Gn+2 is applied to the (3k)-th gate line GL3k.

A switching element SW of the first sensing part SP1 is driven by the first and the second gate pulses g1 and g2 of the first gate signal Gn, and a reset element RS of the first sensing part SP1 is reset by the first and the second gate pulses g1 and g2 of the second gate signal Gn+1. A switching element SW of the second sensing part SP2 is driven by the first and the second gate pulses g1 and g2 of the second gate signal Gn+1, and a reset element RS of the second sensing part SP2 is reset by the first and the second gate pulses g1 and g2 of the third gate signal Gn+2, and so on.

As shown FIGS. 2 and 3, the second pulse g2 of the first gate signal Gn is applied to the (3k−2)-th gate line GL3k−2, and the first gate pulse g1 of the third gate signal Gn+2 is applied to the (3k)-th gate line GL3k at substantially the same time. Accordingly, a switching element SW of the first sensing part SP1 connected to the (3k−2)-th gate line GL3k−2 and a switching element SW of the second sensing part SP2 connected to the (3k)-th gate line GL3k are driven substantially simultaneously. Thus, the amount of electric current of a sensing signal inputted to the amplifier OP at substantially the same time may be doubled.

Figure 4:
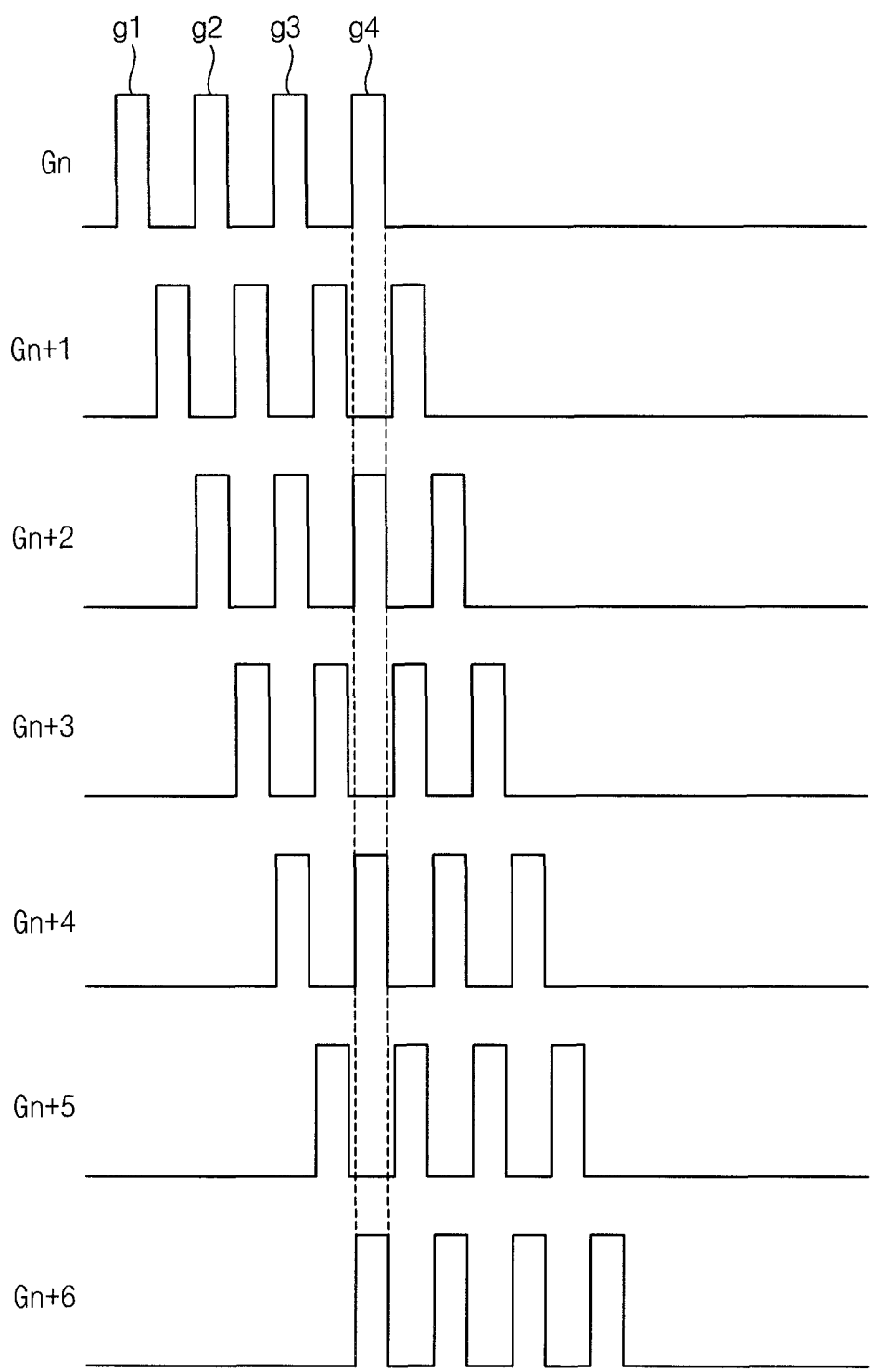
FIG. 4 is a waveform diagram of a gate signal applied to the exemplary embodiment of a touchscreen display device of FIG. 2 in accordance with another exemplary embodiment of the present invention.

FIG. 4 is a waveform diagram of a plurality of gate signals applied to the exemplary embodiment of a touchscreen display device of FIG. 2 in accordance with another exemplary embodiment of the present invention.

Referring to FIGS. 2 and 4, each of gate signals Gn, Gn+1, Gn+2, . . . , Gn+6 provided to the touchscreen display device may include four gate pulses, including a first, second, third, and fourth gate pulse g1, g2, g3 and g4, respectively within one frame. Here, 'n' is a natural number.

In one exemplary embodiment, the first gate signal Gn is applied to the first gate line, the second gate signal Gn+1 is applied to the second gate line, the third gate signal Gn+2 is applied to the third gate line, and the seventh gate signal Gn+6 is applied to the seventh gate line by substantially the same process as described in detail above.

The first to the seventh gate lines are connected to the first and the second sensing parts SP1 and SP2 as shown FIG. 2. For example, the first, third, fifth and seventh gate lines are connected to the switching elements SW of the first sensing part SP1 to control the switching elements SW of the first sensing part SP1. The second, fourth and sixth gate line are connected to the reset elements RS of the first sensing part SP1 to control the reset elements RS of the first sensing part SP1. Additionally, the second, fourth and sixth gate lines are connected to the switching elements SW of the second sensing part SP2 to control the switching elements SW of the second sensing part SP2. The third, fifth and seventh gate lines are connected to the reset elements RS of the second sensing part SP2 to control the reset elements RS of the second sensing part SP2. Here, the first and second sensing parts SP1 and SP2 may be alternatingly arranged with respect to respective gate lines, e.g., a first sensing part SP1 is connected to the first gate line, a second sensing part SP2 is connected to the second gate line, an additional component of the first sensing part SP1 is connected to the third gate line, an additional component of the second sensing part SP2 is connected to the fourth gate line, etc.

As shown FIG. 4, the fourth gate pulse g4 of the first gate signal Gn, the third gate pulse g3 of the third gate signal Gn+2, the second gate pulse g2 of the fifth gate signal Gn+4 and the first gate pulse g1 of the seventh gate signal Gn+6 are provided to the first, the third, the fifth and the seventh gate lines at substantially the same time.

Accordingly, the switching elements SW of the first sensing part SP1 connected to the first, third, fifth and seventh gate lines are driven at substantially the same time. Thus, the amount of electric current of a sensing signal input to the amplifier OP at substantially the same time may be increased by a factor of four times.

As described in FIGS. 3 and 4, in one exemplary embodiment, the gate signal may include gate pulses of an even number. However, as the number of the gate pulses increases, sensing characteristics may deteriorate. Accordingly, the number of the gate pulses may be set based on an applied example. Alternative exemplary embodiments include configurations wherein the gate signal may include gate pulses of an odd number.

Figure 5:
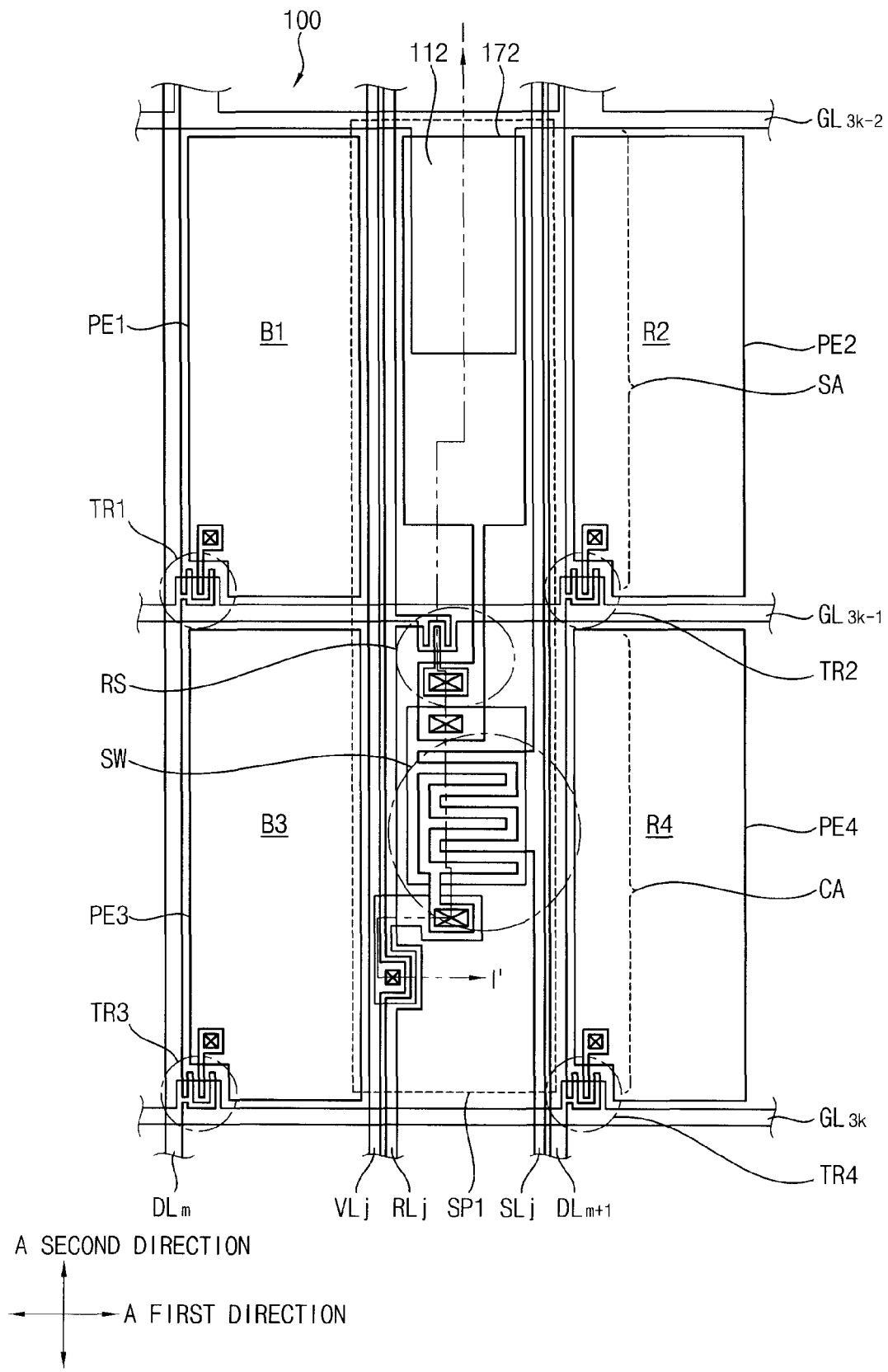
FIG. 5 is an enlarged plan view illustrating a portion 'A' of the exemplary embodiment of a touchscreen display device of FIG. 1.
Figure 6:
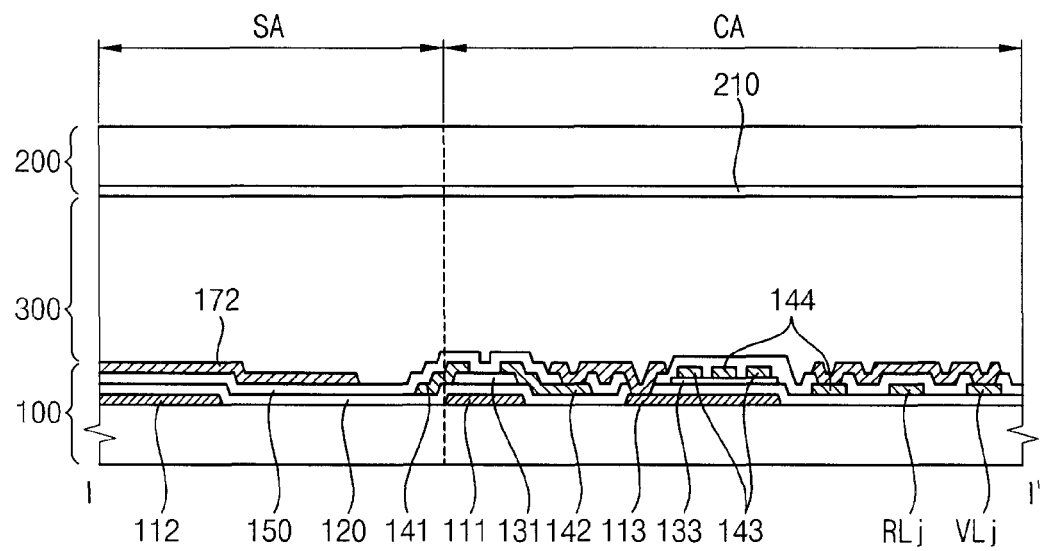
FIG. 6 is a cross-sectional view illustrating an exemplary embodiment of a touchscreen display device taken along line I-I' of FIG. 5.

FIG. 5 is an enlarged plan view illustrating a portion 'A' of the exemplary embodiment of a touchscreen display device of FIG. 1. FIG. 6 is a cross-sectional view illustrating an exemplary embodiment of a touchscreen display device taken along line I-I' of FIG. 5.

Referring to FIGS. 1, 5 and 6, the touchscreen display device includes a touchscreen display substrate 100, an opposite substrate 200 and a liquid crystal layer 300.

The touchscreen display substrate 100 may include a plurality of gate lines GL3k–2, GL3k–1 and GL3k, a plurality of data lines DLm and DLm+1, a plurality of voltage lines VLj, a plurality of reset lines RLj and a plurality of sensing lines SLj. In the present exemplary embodiment, the gate lines GL3k–2, GL3k–1 and GL3k extend in a first direction. In the present exemplary embodiment, the data lines DLm and DLm+1, the voltage lines VLj, the reset lines RLj and the sensing lines SLj are extended in a second direction substantially perpendicular to the first direction.

In one exemplary embodiment, a blue pixel B1 of the first pixel part P1 may include a first driving element TR1 connected to the (3k–1)-th gate line GL3k–1 and m data line DLm and a first pixel electrode PE1 electrically connected to the first driving element TR1. When the first driving element TR1 is turned on, a pixel voltage is applied to the first pixel electrode PE1. The blue pixel B1 may include the first pixel electrode PE1, a portion of the liquid crystal layer 300 and a liquid crystal capacitor including a common electrode 210 of the opposite substrate 200 and the first pixel electrode PE1. The liquid crystal capacitor controls the arrangement of liquid crystal molecules in the liquid crystal layer by the application of an electric field formed by the first pixel electrode PE1 and the common electrode 210 to display a blue color gray scale of an image.

A red pixel R2 of the second pixel part P2 may include a second driving element TR2 connected to the (3k–1)-th gate line GL3k–1 and an (m+1)-th data line DLm+1, and a second pixel electrode PE2 electrically connected to the second driving element TR2. The red pixel R2 may include the second pixel electrode PE2, a portion of the liquid crystal layer 300 and a liquid crystal capacitor including the common electrode 210 of the opposite substrate 200 and the second pixel electrode PE2.

A blue pixel B3 of the third pixel part P3 may include a third driving element TR3 connected to the (3k)-th gate line GL3k and the m data line DLm, and a third pixel electrode PE3 electrically connected to the third driving element TR3. The blue pixel B3 may include the third pixel electrode PE3, a portion of the liquid crystal layer 300 and a liquid crystal capacitor including the common electrode 210 of the opposite substrate 200 and the third pixel electrode PE3.

A red pixel R4 of the fourth pixel part P4 may include a fourth driving element TR4 connected to the (3k)-th gate line GL3k and the (m+1)-th data line DLm+1, and a fourth pixel electrode PE4 electrically connected to the fourth driving element TR4. The red pixel R4 may include the fourth pixel electrode PE4, a portion of the liquid crystal layer 300 and a liquid crystal capacitor including the common electrode 210 of the opposite substrate 200 and the fourth pixel electrode PE4.

The first sensing part SP1 is disposed between the blue pixel B1 of the first pixel part P1 and the red pixel R2 of the second pixel part P2, and is disposed between the blue pixel B3 of the third pixel part P3 and the red pixel R4 of the fourth pixel part P4. In the present exemplary embodiment, the first sensing part SP1 is divided into a sensing area SA and a circuit area CA. The sensing area SA includes a first area disposed between the first and the second pixel parts P1 and P2, and the circuit area CA includes a second area disposed between the third and the fourth pixel parts P3 and P4. In one exemplary embodiment, the sensing area SA may include an area which is substantially the same as the circuit area CA. In another exemplary embodiment the sensing area SA may be larger than the circuit area CA.

The first sensing part SP1 may include a reference capacitor Cref, a sensing capacitor Clc, a reset element RS and a switching element SW as discussed with respect to FIGS. 1 and 2 above. In the present exemplary embodiment, the reference capacitor Cref and the sensing capacitor Clc are disposed on the sensing area SA.

A first electrode 112 of the reference capacitor Cref protrudes from the (3k–2)-th gate line GL3k–2 into the sensing area SA. A transparent second electrode 172 is formed of a material substantially identical to the first pixel electrode PE1, and overlaps the first electrode 112. The reference capacitor Cref includes the first electrode 112 and the transparent second electrode 172 which are overlapped with each other, and insulation layers 120 and 150 interposed between the first and second electrodes 112 and 172.

In one exemplary embodiment, the area of the first electrode 112 is about 200 µm×about 40 µm, the thickness of the insulation layers 120 and 150 is about 0.47 µm, and the dielectric constant $\in$ of the insulation layers 120 and 150 is about 6.6. In one exemplary embodiment, the capacitance of the reference capacitor Cref is about 1 pF.

A touch electrode of the sensing capacitor Clc includes a portion of the transparent second electrode 172 which does not overlap the first electrode 112 of the reference capacitor Cref. The sensing capacitor Clc includes the touch electrode, the liquid crystal layer 300 and the common electrode 210 formed on the opposite substrate 200.

In one exemplary embodiment, the area of the touch electrode of the sensing capacitor Clc is about 155 µm×about 40 µm, and the thickness of the liquid crystal layer 300 is about 0.9 µm, and the dielectric constant $\in$ of the liquid crystal layer 300 is about 7. In one exemplary embodiment, the capacitance of the reference capacitor Cref is about 0.43 pF.

In the present exemplary embodiment, the reset element RS and the switching element SW are disposed on the circuit area CA. The reset element RS may include a control electrode 111 connected to the (3k–1)-th gate line GL3k–1, an input electrode 141 connected to the (j)-th reset line RLj and an output electrode 142 spaced apart from the input electrode 141. In addition, the reset element RS may include a semiconductor layer 131 disposed on the control electrode 111.

The switching element SW may include a control electrode 113 electrically connected to an output electrode 142 of the reset element RS, an input electrode 143 connected to the (j)-th voltage line VLj and an output electrode 144 connected to the (j)-th sensing line SLj. The switching element SW may further include a semiconductor layer 133 disposed on the control electrode 113. As shown FIGS. 5 and 6, in the present exemplary embodiment the input electrode 143 and the output electrode 144 of the switching element SW have a zigzag shape to form a wider channel width W. In one exemplary embodiment, a channel width W of the switching element SW is about 275 µm, and a channel length L of the switching element SW is about 4.5 µm.

As described above, because one sensing part SP corresponds to two pixel areas adjacent to each other in a second direction (e.g., a column direction), the size of the switching element may be increased, and an electrode area of the sensing capacitor and the reference capacitor may be large. Thus, sensing characteristics may be improved.

Figure 7:
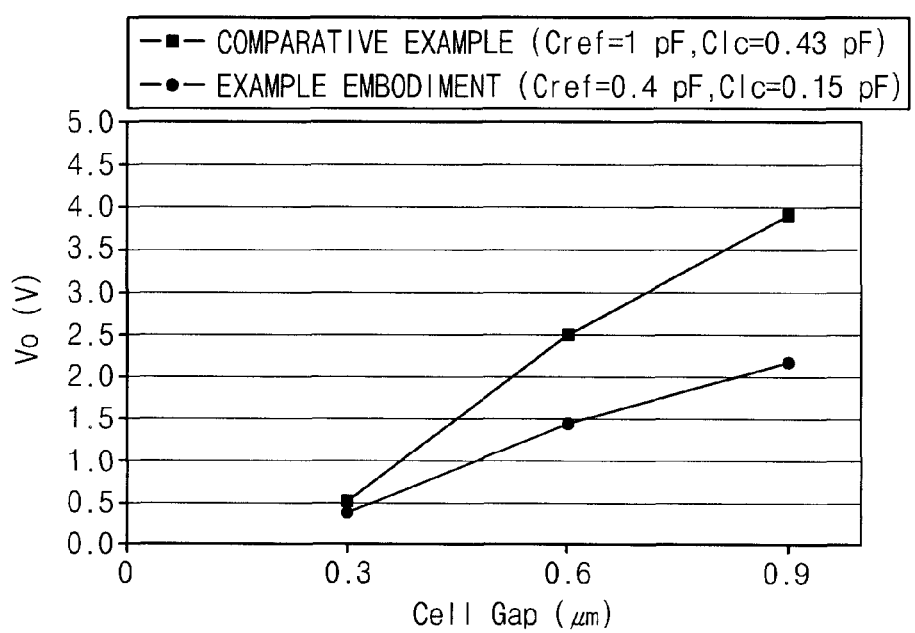
FIG. 7 is a graph illustrating a range of a readout signal in a readout part according to an exemplary embodiment and a comparative example.

FIG. 7 is a graph illustrating a range of a readout signal in a readout part according to an exemplary embodiment and a comparative example.

Referring to FIGS. 1 and 7, the conditions of the touchscreen display devices were set as follows. In the exemplary embodiment of a touchscreen display, a channel width W of the switching element SW disposed on the first and the second sensing part SP1 and SP2 was about 275 μm, and a channel length L was about 4.5 μm. A channel width W of the reset element RS was about 32 μm, and a channel length L was about 4.5 μm. For both the exemplary embodiment and the comparative example, a high voltage Vg+ of gate signal was about 25 V, and a low voltage Vg− was about −7 V. A common voltage applied to the second electrode of the sensing capacitor Clc was about 7 V, and a power voltage Vdd was about 10 V, and a reset voltage Vreset was about −7 V.

According to the above conditions, the level ranges of readout signals Vo of an example embodiment and a comparative example were compared to each other. The conditions of the exemplary embodiment were that the capacitance of the reference capacitor Cref was about 1 pF and the capacitance of the sensing capacitor Clc was about 0.43 pF, and the conditions of the comparative example were that the capacitance of the reference capacitor Cref was about 0.4 pF and the capacitance of the sensing capacitor Clc was about 0.15 pF.

Thus, the level range of the readout signal Vo of the exemplary embodiment was increased more than the comparative example. As the capacitance of the reference capacitor Cref and the sensing capacitor Clc are increased, sensing characteristics of sensing part may be improved.

Figure 8:
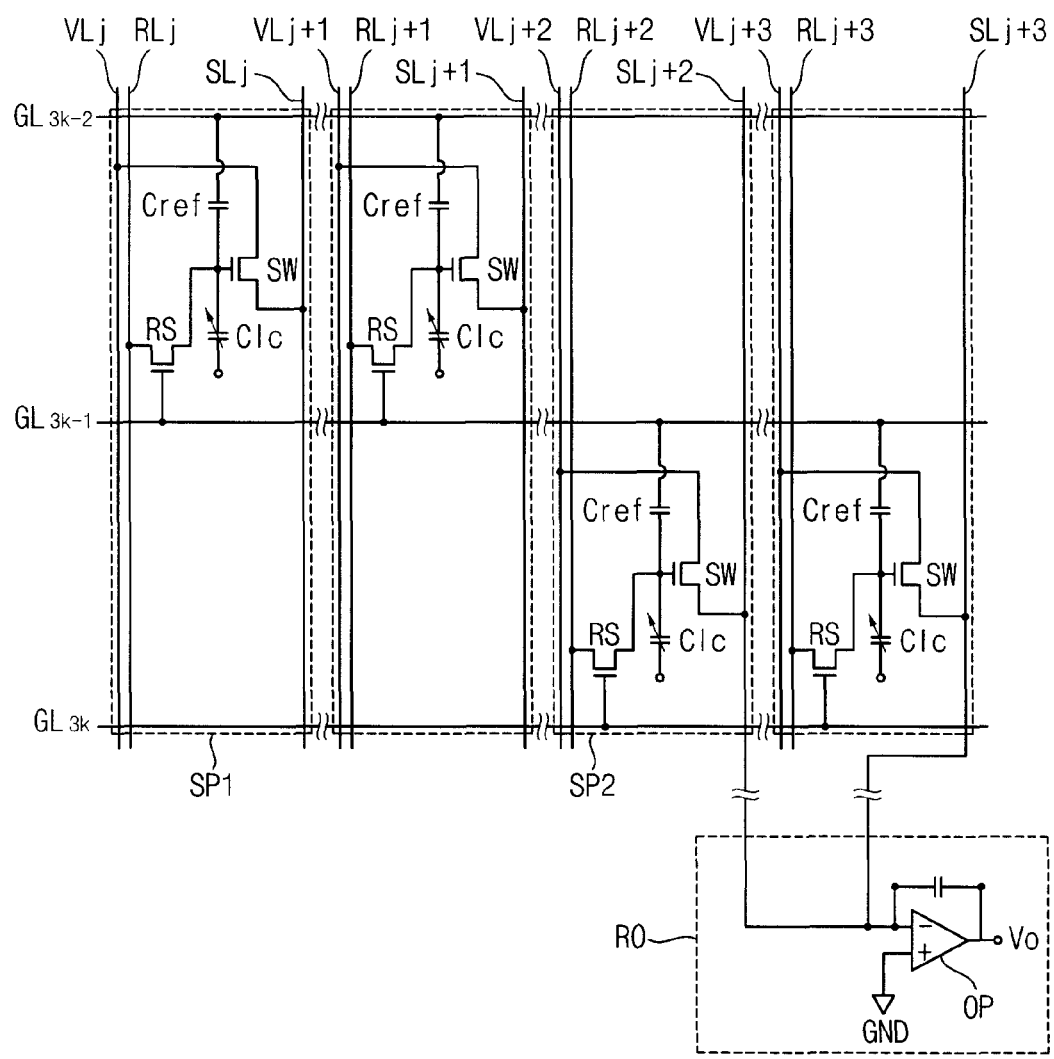
FIG. 8 is a schematic circuit diagram illustrating an exemplary embodiment of a sensing part of the exemplary embodiment of a touchscreen display device according to Exemplary Embodiment 2 of the present invention.

FIG. 8 is a schematic circuit diagram illustrating an exemplary embodiment of a sensing part of the exemplary embodiment of a touchscreen display device according to Exemplary Embodiment 2 of the present invention. A touchscreen display device according to this exemplary embodiment is substantially identical to the touchscreen display device of Exemplary Embodiment 1 except for the readout part RO. Thus, the same reference numerals will be used to refer to elements that are substantially identical to the touchscreen display device of Exemplary Embodiment 1, and any detailed explanation will be omitted to avoid redundancy.

Referring to FIGS. 1 and 8, a readout part RO of the touchscreen display device according to exemplary embodiment 2 may include a plurality of amplifiers. Each of the amplifiers OP is connected to sensing lines outputting a sensing signal of sensing parts SP1 and SP2 having reset elements RS connected to the same gate line, as opposed to different gate lines as disclosed with respect to exemplary embodiment 1. In the present exemplary embodiment, sensing signals provided from a plurality of sensing lines SLj+2 and SLj+3 is input to the amplifier OP, and the amplifier OP outputs a readout signal Vo in response to the sensing signals. Sensing signals outputted from a pair of the first or the second sensing parts SP1 and SP2 are input to the amplifier OP, and the readout signal Vo is output in response to the sensing signals.

The amplifier OP receives sensing signals transmitted through the sensing lines SLj+2 and SLj+3 for 1H, wherein 'H' is a horizontal period as discussed above, in which a high level signal is applied to the (3k−1)-th gate line. Alternative exemplary embodiments include configurations wherein, sensing signals may be received, the sensing signal is transmitted through the sensing lines SLj and SLj+1 for 1H in which a high level signal is applied to the (3k−2)-th gate line (not shown).

A sensing signal having a double electric current comparative to exemplary embodiment 1 is input to input terminals of the amplifier OP for 1H. As an amount of electric current of a signal input to the amplifier OP is increased, the readout signal Vo may be easily output. When sensing signals are input from a pair of the second sensing part SP2 to the amplifier OP, the amplifier OP outputs the readout signal Vo by periods of 2H.

A gate signal provided to the touchscreen display device of this exemplary embodiment may include gate pulses of an even number as described in FIGS. 3 and 4.

Figure 9:
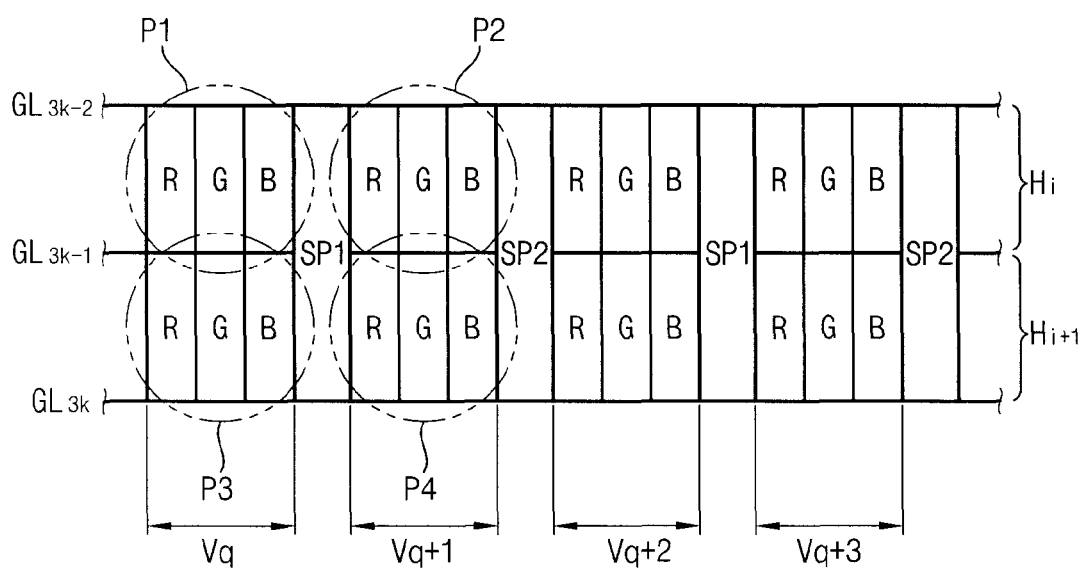
FIG. 9 is a diagram illustrating an exemplary embodiment of a touchscreen display device according to Exemplary Embodiment 3 of the present invention.
Figure 10:
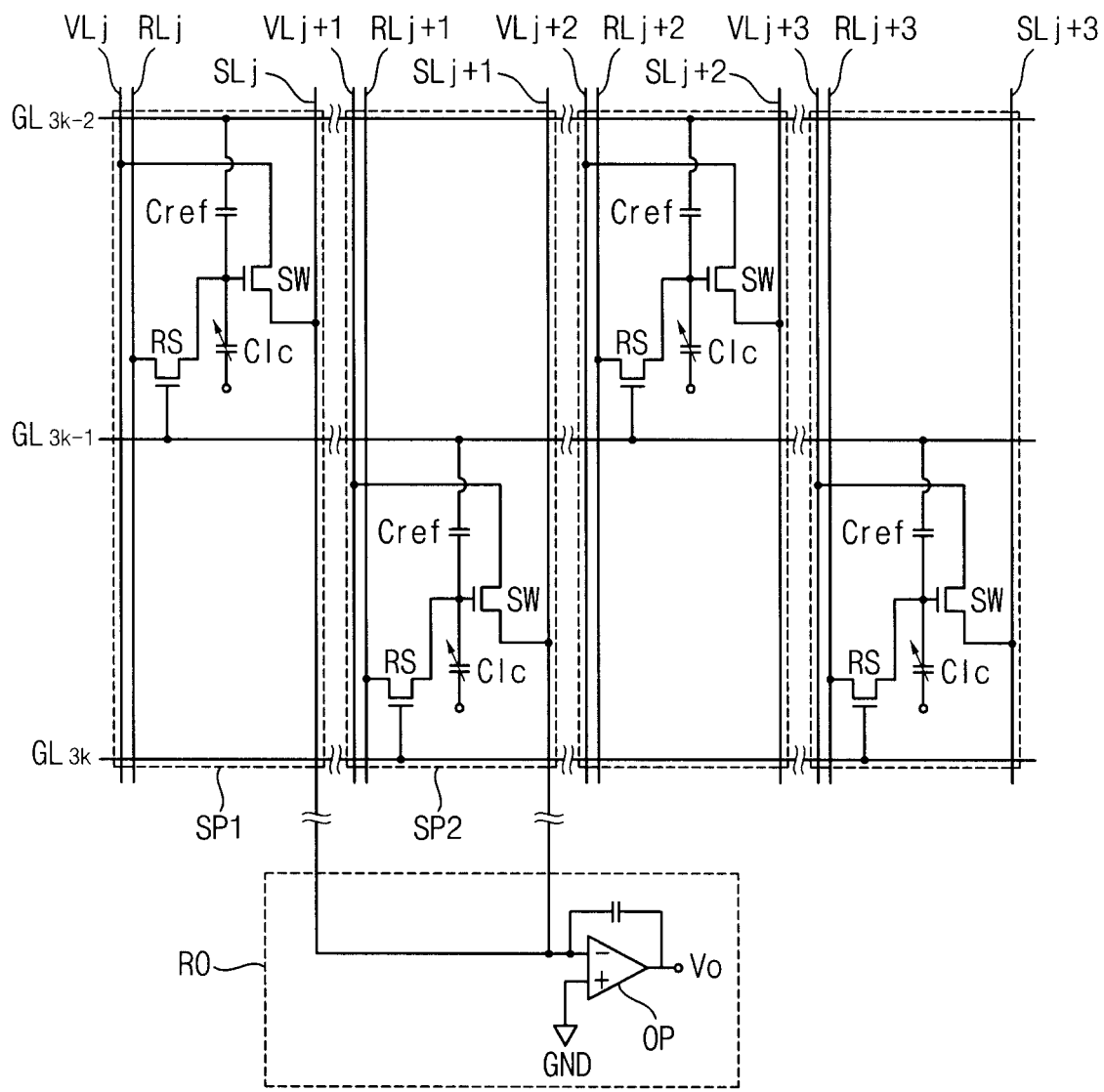
FIG. 10 is a schematic circuit diagram illustrating an exemplary embodiment of a sensing part of the exemplary embodiment of a touchscreen display device of FIG. 9.

FIG. 9 is a diagram illustrating an exemplary embodiment of a touchscreen display device according to exemplary embodiment 3 of the present invention. FIG. 10 is a schematic circuit diagram illustrating an exemplary embodiment of a sensing part of the exemplary embodiment of a touchscreen display device of FIG. 9. A touchscreen display device according to this exemplary embodiment is substantially identical to the exemplary embodiment of a touchscreen display device of exemplary embodiment 1 except for the arrangement configuration of first and second sensing parts. Thus, the same reference numerals will be used to refer to elements that are substantially identical to the exemplary embodiment of a touchscreen display device of exemplary embodiment 1, and any detailed explanation will be omitted to avoid redundancy.

Referring to FIGS. 9 and 10, the exemplary embodiment of a touchscreen display device includes a plurality of pixel parts P, a plurality of sensing parts SP1 and SP2 detecting touch positions, and a readout part RO.

The pixel parts may be disposed in a matrix shape, and each of the pixel parts P may include a plurality of color pixels. In one exemplary embodiment, each of the pixel parts may include a red pixel R, a green pixel G and a blue pixel B adjacent to each other in a first direction.

A plurality of pixel parts may include a plurality of horizontal rows Hi and Hi+1 and a plurality of columns Vq, . . . , Vq+3. In one exemplary embodiment, an (i)-th horizontal row Hi may include pixel parts electrically connected to the (3k−1)-th gate line GL3k−1, and (i+1)-th horizontal row Hi+1 may include pixel parts electrically connected to the (3k)-th gate line GL3k.

The sensing parts may be disposed in an area corresponding to a plurality of pixel parts sequentially disposed between adjacent vertical columns in the second direction. The sensing parts may include two types, that is, a first sensing part SP1 and a second sensing part SP2. As shown in FIG. 9, the first sensing part SP1 is disposed in an area corresponding to the first and the third pixel parts P1 and P3 between the first and second parts P1 and P2, and the first sensing part SP1 and the second sensing part SP2 are disposed in an alternating arrangement along the first direction.

The first sensing part SP1 is driven by the gate signal of a high level applied to the (3k−2)-th gate line GL3k−2, and the first sensing part SP1 is reset by the gate signal of a high level applied to the (3k−1)-th gate line GL3k−1. The second sensing part SP2 is driven by the gate signal of a high level applied to the (3k−1)-th gate line GL3k−1, and the second sensing part SP2 is reset by the gate signal of a high level applied to the (3k)-th gate line GL3k.

In one exemplary embodiment, the readout part RO may include a plurality of amplifiers. A sensing signal provided from the sensing lines is input to each of the amplifiers OP. The amplifiers OP are connected to the sensing lines SLj and SLj+1 outputting a sensing signal of sensing parts SP1 and SP2 having reset elements RS connected to gate lines different from each other, e.g., similar to the first exemplary embodiment. The amplifiers OP output the readout signal Vo in response to the sensing signals provided from a plurality of sensing lines SLj and SLj+1.

In one exemplary embodiment, the amplifiers OP output a readout signal Vo in response to a sensing signal transmitted through sensing line SLj+1 when a high level signal is applied to the (3k−2)-th gate line during a horizontal period 1H, and the amplifiers OP output a readout signal Vo in response to a sensing signal transmitted through (j+2)-th sensing line SLj+2 when a high level signal is applied to the (3k−1)-th gate line, that is, during a horizontal period 1H. Accordingly, the amplifier OP outputs the readout signal Vo by a horizontal period 1H.

The amplifier OP may receive sensing signals from the first or the second sensing parts, similar to that described with respect to exemplary embodiment, which may receive sensing signals from only one type of sensing part at each readout part RO, e.g., the readout part RO receives two sensing signals from sensing parts SP1 and SP1 and thereby has a horizontal readout signal Vo period of 1H. An amount of electric current of a sensing signal input to the amplifier OP is increased, and an output period of the readout signal Vo is 2H.

A gate signal provided to the exemplary embodiment of a touchscreen display device of this exemplary embodiment may include gate pulses of an even number as described in FIGS. 3 and 4.

Figure 11:
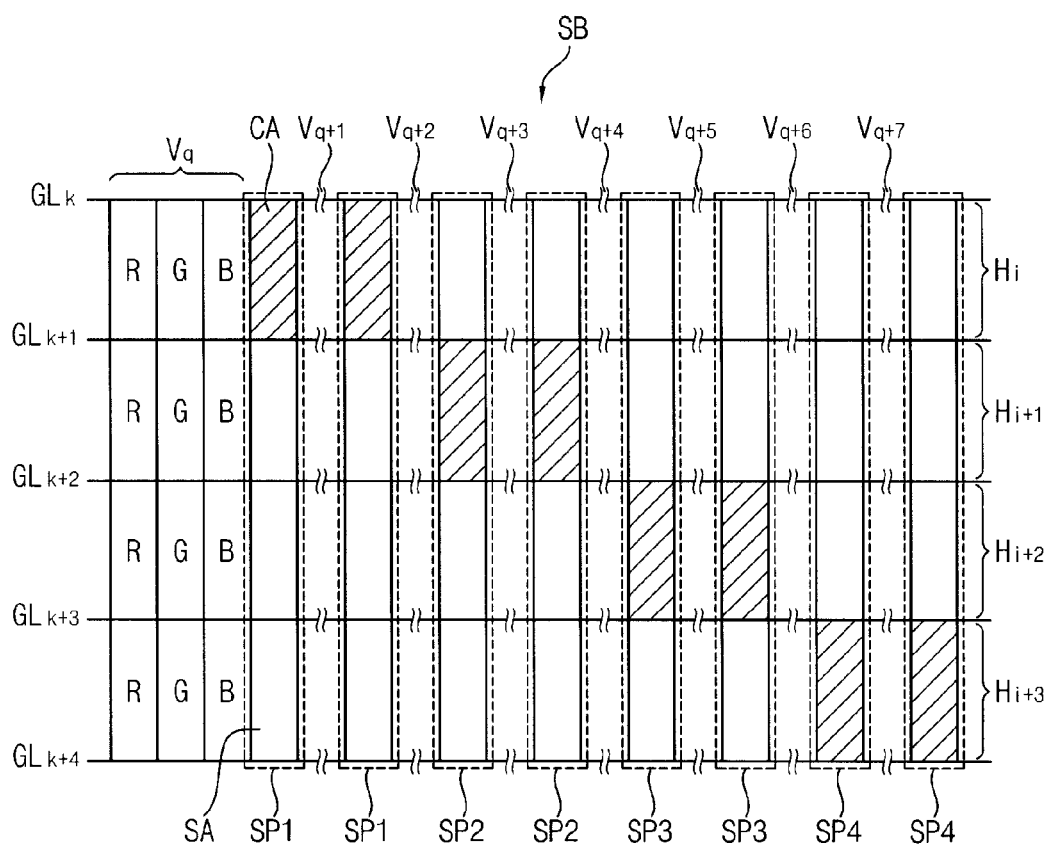
FIG. 11 is a diagram illustrating an exemplary embodiment of an arrangement of a sensing part in an exemplary embodiment of a touchscreen display device according to Exemplary Embodiment 4 of the present invention.

FIG. 11 is a diagram illustrating an arrangement of a sensing part in an exemplary embodiment of a touchscreen display device according to exemplary embodiment 4 of the present invention.

Referring to FIGS. 2 and 11, the exemplary embodiment of a touchscreen display device includes a plurality of pixel parts, a first sensing part SP1, a second sensing part SP2, a third sensing part SP3 and a fourth sensing part SP4.

The pixel parts may include a plurality of horizontal rows Hi, Hi+1, Hi+2 and Hi+3 and a plurality of vertical columns Vq, . . . , Vq+7. In one exemplary embodiment, an (i)-th horizontal row Hi may include pixel parts electrically connected to the (k+1)-th gate line GLk, and (i+1)-th horizontal row Hi+1 may include pixel parts electrically connected to the (k+2)-th gate line GLk+2, and (i+2)-th horizontal row Hi+2 may include pixel parts electrically connected to the (k+3)-th gate line GLk+2, and (i+3)-th horizontal row Hi+3 may include pixel parts electrically connected to the (k+4)-th gate line GLk+4. Here, 'i' and 'q' are natural numbers.

Each of the first to the fourth sensing parts SP1, SP2, SP3 and SP4 may be disposed in an area corresponding to one of four of horizontal rows between the adjacent vertical columns.

When a sensing block SB of an 8×4 matrix shape is defined, the sensing block may include a pair of first sensing parts SP1, a pair of second sensing parts SP2 adjacent to the pair of the first sensing parts SP1, a pair of third sensing parts SP3 adjacent to the pair of the second sensing parts SP2, and a pair of fourth sensing parts SP4 adjacent to the pair of the third sensing part SP3. The sensing block is disposed so that the pair of first sensing parts SP1, the pair of second sensing parts SP2, the pair of third sensing parts SP3 and the pair of fourth sensing parts SP3 are disposed one after the other in a first direction.

The first sensing part SP1 is driven by the gate signal of a high level applied to the (k)-th gate line GLk, and the first sensing part SP1 is reset by the gate signal of a high level applied to the (K+1)-th gate line GLk+1.

The first sensing part SP1 may include a reference capacitor Cref, a sensing capacitor Clc, a switching element SW and a reset element RS as shown FIG. 2.

The reference capacitor Cref may include a first electrode connected to the k gate line GLk and a second electrode connected to the sensing capacitor Clc. The sensing capacitor Clc may include a touch electrode connected to the second electrode of the reference capacitor Cref and a common electrode applied common voltage Vcom.

The switching element SW may include an input electrode connected to the (j)-th voltage line VLj applied a power signal Vdd, a control electrode connected to the reference capacitor Cref and the sensing capacitor Clc, and an output electrode outputting a sensing signal. The output electrode of the switching element SW is connected to the (j)-th sensing line SLj. The reset element RS may include a control electrode connected to the (k+1)-th gate line GLk+1, an input electrode connected to the (j)-th reset line RLj to which the reset signal Vreset, and an output electrode connected to the control electrode of the switching element SW is applied. As discussed herein, T is a natural number.

The second sensing part SP2 is driven by the gate signal of a high level applied to the (k+1)-th gate line GLk-1, and the second sensing part SP2 is reset by the gate signal of a high level applied to the (k+2)-th gate line GLk+2. The second sensing part SP2 may include a reference capacitor Cref connected to the (k+1)-th gate line GL(k+1)-th and a switching element SW connected to (k+2)-th gate line GLk+2.

The third sensing part SP3 is driven by the gate signal of a high level applied to the (k+2)-th gate line GLk+2, and the third sensing part SP3 is reset by the gate signal of a high level applied to the (k+3)-th gate line GLk+3. The third sensing part SP3 may include a reference capacitor Cref connected to the (k+2)-th gate line GLk+2 and a switching element SW connected to (k+3)-th gate line GLk+3.

The fourth sensing part SP4 is driven by the gate signal of a high level applied to the (k+3)-th gate line GLk+3, and the fourth sensing part SP4 is reset by the gate signal of a high level applied to the (k+4)-th gate line GLk+4. The fourth sensing part SP4 may include a reference capacitor Cref connected to the (k+3)-th gate line GLk+3 and a switching element SW connected to (k+4)-th gate line GLk+4.

A sensing block SB having four sensing parts SP1, SP2, SP3 and SP4 is disclosed. Alternative exemplary embodiments include configurations wherein a sensing block SB may have p sensing parts SP, . . . , SPp. In such an alternative exemplary embodiment, the first sensing part SP1 may include a reference capacitor connected to the k gate line and a reset element connected to the (k+1)-th gate line. The second sensing part SP2 may include a reference capacitor connected to the (k+1)-th gate line and a reset element connected to the (k+2)-th gate line. The p sensing part SPp may include a reference capacitor connected to the (k+(p−1))-th gate line and a reset element connected to the (k+p)-th gate line.

Each of the first to the fourth sensing parts SP1, SP2, SP3 and SP4 may include a circuit area CA corresponding to one pixel area and a sensing area SA corresponding to three pixel areas. In one exemplary embodiment, the circuit area may have about the same area as an individual pixel electrode, and the sensing area may have about same area as three combined pixel electrodes.

In the present exemplary embodiment, the reset element RS and the switching element SW are disposed on the circuit area CA, and the reference capacitor Cref and the sensing capacitor Cls are disposed on the sensing area SA. As the areas of the circuit area CA and the sensing area SA are increased, the size of the switching element may be increased, and an electrode area of the sensing capacitor and the reference capacitor may be increased. The sensing area SA of the present exemplary embodiment is larger than the sensing areas of exemplary embodiments 1 to 3. Thus, the electrode area of the reference capacitor Cref and the sensing capacitor Clc may be larger than the electrode area of the exemplary embodiments 1 to 3.

Accordingly, sensing characteristics of the first to the fourth sensing parts SP1, SP2, SP3 and SP4 may be improved.

An exemplary embodiment of a touchscreen display device of this exemplary embodiment may include a readout RO part having a plurality of amplifiers OP as shown FIG. 2. The amplifier OP of this exemplary embodiment outputs readout signal Vo in response to sensing signals received from a plurality of sensing lines.

In one exemplary embodiment, the amplifier OP may receive a sensing signal from the first and the second sensing parts SP1 and SP2 or the third and the fourth sensing parts SP3 and SP4. Alternative exemplary embodiments include configurations wherein the amplifier OP may receive a sensing signal from a pair of the first, the second, the third or the fourth sensing parts SP1, SP2, SP3 or SP4. Alternative exemplary embodiments include configurations wherein the amplifier OP may receive a sensing signal from any two of the first to the fourth sensing parts SP1, SP2, SP3 and SP4 in combination.

A gate signal provided to the touchscreen display device of this exemplary embodiment may include gate pulses of an even number as described in FIGS. 3 and 4.

According to the present exemplary embodiment, as a sensing part is formed in an area corresponding to a plurality of pixel areas to form a large-sized switching element, the sizes of a reference capacitor and a sensing capacitor may be increased. Thus, sensing characteristics of the sensing part may be improved.

In addition, sensing parts are uniformly connected to gate lines in a zigzag shape to prevent display defects according to signal delays.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A touchscreen display substrate comprising:
a plurality of pixel parts comprising:
a plurality of pixel rows disposed in a first direction;
a plurality of pixel columns disposed in a second direction substantially perpendicular to the first direction,
wherein each of the plurality of pixel parts includes a plurality of pixels; and
a plurality of sensing parts which sense a touch state when pressure is applied, each of the plurality of sensing parts being disposed in an area corresponding to the plurality of pixel parts sequentially arranged in the second direction and being disposed between adjacent pixel columns;
a gate line disposed in the first direction;
a data line disposed substantially in the second direction;
a voltage line which applies a power voltage to the sensing parts;
a reset line which applies a reset voltage to the sensing parts; and
a sensing line which outputs a sensing signal from at least one of the plurality of sensing parts to an exterior,
wherein the plurality of sensing parts comprise:
a first sensing part comprising:
a reference capacitor connected to a $(3k-2)$-th gate line, wherein 'k' is a natural number;
a touch electrode connected to the reference capacitor;
a switching element connected to the touch electrode; and
a reset element connected to a $(3k-1)$-th gate line; and
a second sensing part comprising:
a reference capacitor connected to the $(3k-1)$-th gate line;
a touch electrode connected to the reference capacitor;
a switching element connected to the touch electrode; and
a reset element connected to the $(3k)$-th gate line.

2. The touchscreen display substrate of claim 1, wherein the switching element of at least one of the first sensing part and the second sensing part comprises:
a control electrode connected to the touch electrode;
an input electrode connected to the voltage line; and
an output electrode connected to the sensing line.

3. The touchscreen display substrate of claim 2, wherein a width-to-length ratio of a channel width to a channel length of the switching element is about 100:4.5 to about 400:4.5.

4. The touchscreen display substrate of claim 1, wherein the sensing parts comprise:
a pair of first sensing parts disposed adjacent to one another in the first direction; and
a pair of second sensing parts disposed adjacent to one another in the first direction,
wherein the pair of first sensing parts is adjacent to the pair of second sensing parts so that at least one first sensing part is adjacent to at least one second sensing part.

5. The touchscreen display substrate of claim 1, wherein the first sensing part and the second sensing part are disposed in an alternating arrangement in the first direction.

6. The touchscreen display substrate of claim 1, wherein:
each of the plurality of pixel parts comprises a plurality of color pixels, respectively,
each of the first and second sensing parts comprises a circuit area in which the switching element and the reset element are disposed and a sensing area in which the reference capacitor and the touch electrode are disposed, and
the sensing area has an area corresponding to at least one color pixel area.

7. The touchscreen display substrate of claim 6, wherein the size of the sensing area is greater than or equal to a size of an individual pixel area.

8. A touchscreen display substrate comprising:
a plurality of pixel parts comprising:
a plurality of pixel rows disposed in a first direction;
a plurality of pixel columns disposed in a second direction substantially perpendicular to the first direction,
wherein each of the plurality of pixel parts includes a plurality of pixels; and
a plurality of sensing parts which sense a touch state when pressure is applied, each of the plurality of sensing parts being disposed in an area corresponding to the plurality of pixel parts sequentially arranged in the second direction and being disposed between adjacent pixel columns;
a gate line disposed in the first direction;
a data line disposed substantially in the second direction;

a voltage line which applies a power voltage to the sensing parts;
a reset line which applies a reset voltage to the sensing parts; and
a sensing line which outputs a sensing signal from at least one of the plurality of sensing parts to an exterior,
wherein the plurality of sensing parts comprise:
a first sensing part comprising:
a reference capacitor connected to a ($3k-2$)-th gate line;
a touch electrode connected to the reference capacitor,
a switching element connected to a (j)-th voltage line and a (j)-th sensing line; and
a reset element connected to a ($3k-1$)-th gate line, the (j)-th reset line and the switching element; and
a second sensing part comprising:
a reference capacitor connected to a ($3k-1$)-th gate line;
a touch electrode connected to the reference capacitor,
a switching element connected to a (j+n)-th voltage line and a (j+n)-th sensing line; and
a reset element connected to a ($3k$)-th gate line and a (j+n)-th reset line,
wherein 'k', 'j' and 'n' are natural numbers.

9. A touchscreen display substrate comprising:
a plurality of pixel parts comprising:
a plurality of pixel rows disposed in a first direction;
a plurality of pixel columns disposed in a second direction substantially perpendicular to the first direction,
wherein each of the plurality of pixel parts includes a plurality of pixels; and
a plurality of sensing parts which sense a touch state when pressure is applied, each of the plurality of sensing parts being disposed in an area corresponding to the plurality of pixel parts sequentially arranged in the second direction and being disposed between adjacent pixel columns;
a gate line disposed in the first direction;
a data line disposed substantially in the second direction;
a voltage line which applies a power voltage to the sensing parts;
a reset line which applies a reset voltage to the sensing parts; and
a sensing line which outputs a sensing signal from at least one of the plurality of sensing parts to an exterior,
wherein
the plurality of sensing parts are divided into a plurality of sensing blocks having p number of sensing parts, wherein 'k' and 'p' are natural numbers, and each of the plurality of sensing blocks comprises:
a first sensing part which comprises a reference capacitor connected to the (k)-th gate line and a reset element connected to a (k+1)-th gate line,
a second sensing part which comprises a reference capacitor connected to a (k+1)-th gate line and a reset element connected to a (k+2)-th gate line, and
a (p)-th sensing part which comprises a reference capacitor connected to a (k+(p−1))-th gate line and a reset element connected to a (k+p)-th gate line.

10. The touchscreen display substrate of claim 9, wherein a pair of first sensing parts, a pair of second sensing parts and a pair of (p)-th sensing parts are disposed one after the other in the row direction within the sensing block.

11. A touchscreen display device comprising:
a plurality of pixel parts comprising:
a plurality of pixel rows disposed in a first direction; and
a plurality of pixel columns disposed in a second direction substantially perpendicular to the first direction;
wherein each of the plurality of pixel parts include a liquid crystal capacitor which displays grayscale images; and
a plurality of sensing parts, each of the plurality of sensing parts being disposed in an area corresponding to the plurality of pixel parts sequentially arranged in the second direction and being disposed between adjacent pixel columns, each of the plurality of sensing parts comprising a sensing capacitor which senses a touch status when pressure is applied,
wherein each of the plurality of sensing parts comprise:
a first sensing part comprising:
a reference capacitor connected to a ($3k-2$)-th gate line;
a switching element connected to a (j)-th voltage line and a (j)-th sensing line;
wherein the sensing capacitor includes a first sensing capacitor connected to the reference capacitor in the first sensing part, and
a reset element connected to a ($3k-1$)-th gate line, a (j)-th reset line and the switching element; and
a second sensing part comprising:
a reference capacitor connected to a ($3k-1$)-th gate line;
a switching element connected to a (j+n)-th voltage line and a (j+n)-th sensing line; and
a reset element connected to a ($3k$)-th gate line and a (j+n)-th reset line,
wherein the sensing capacitor includes a second sensing capacitor connected to the reference capacitor in the second sensing part, and
wherein 'k', 'j' and 'n' are natural numbers.

12. The touchscreen display device of claim 11, wherein each of the plurality of pixel parts comprises a plurality of color pixels, respectively,
each of the sensing parts comprises a circuit area in which the switching element and the reset element are disposed and a sensing area in which the reference capacitor and the touch electrode are formed, and
the sensing area has an area corresponding to at least one color pixel area.

13. A touchscreen display device comprising:
a plurality of pixel parts comprising:
a plurality pixel rows disposed in a first direction; and
a plurality of pixel columns disposed in a second direction substantially perpendicular to the first direction;
wherein each of the plurality of pixel parts include a liquid crystal capacitor which displays grayscale images; and
a plurality of sensing parts, each of the plurality of sensing parts being disposed in an area corresponding to the plurality of pixel parts sequentially arranged in the second direction and being disposed between adjacent pixel columns, each of the plurality of sensing parts comprising a sensing capacitor which senses a touch status when pressure is applied,
wherein
the plurality of sensing parts are divided into a plurality of sensing blocks each having p numbers of sensing parts, wherein 'p' is a natural number, and each sensing block comprises:
a first sensing part which comprises a reference capacitor connected to a (k)-th gate line and a reset element connected to a (k+1)-th gate line,
a second sensing part which comprises a reference capacitor connected to a (k+1)-th gate line and a reset element connected to a (k+2)-th gate line, and
a (p)-th sensing part which comprises a reference capacitor connected to a (k+(p−1))-th gate line and a reset element connected to a (k+p)-th gate line.

* * * * *